No. 841,586. PATENTED JAN. 15, 1907.
O. SHIDLER.
WEED AND GRASS TRIMMER, &c.
APPLICATION FILED MAR. 3, 1905.
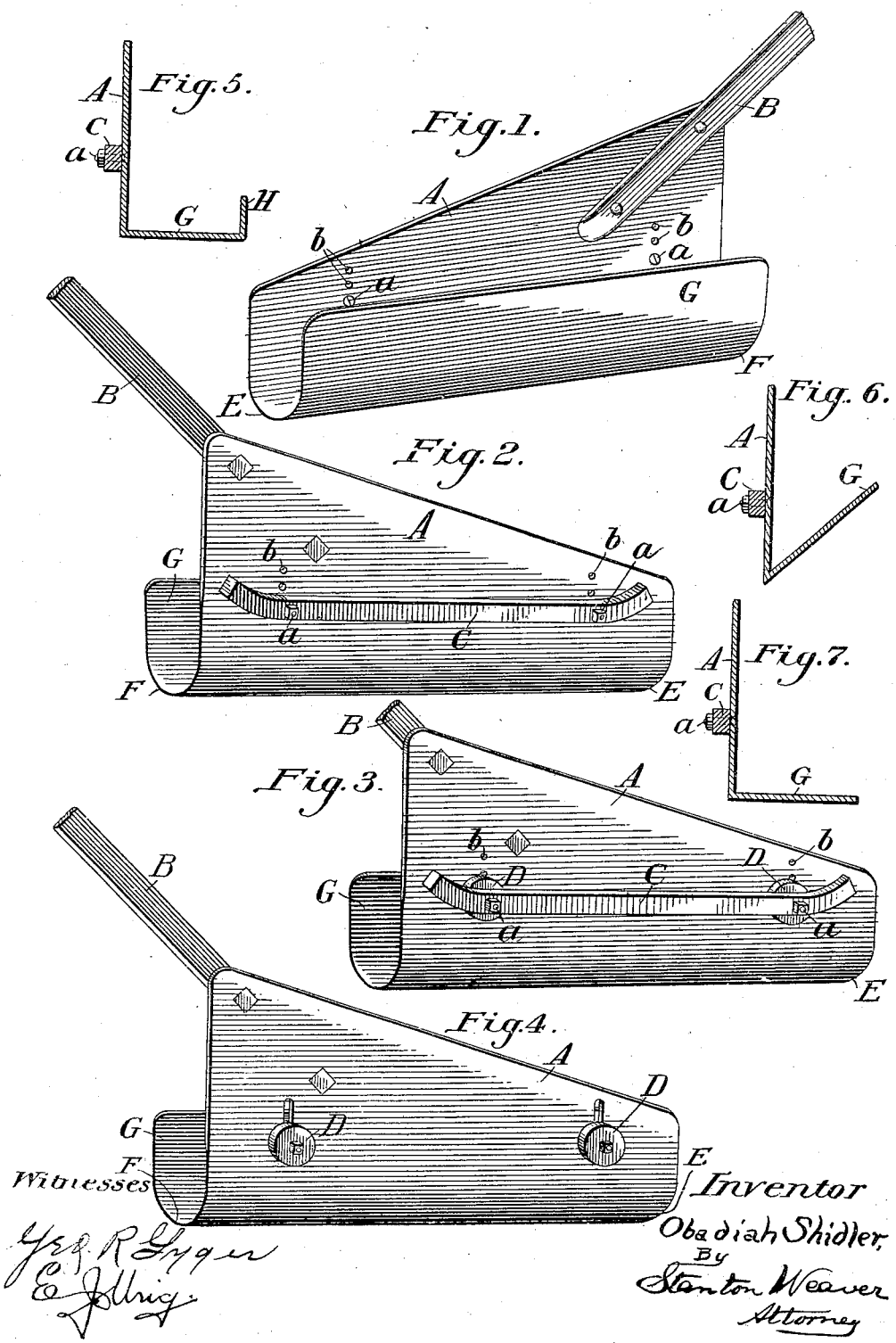
Inventor
Obadiah Shidler,
By
Stanton Weaver
Attorney

UNITED STATES PATENT OFFICE.

OBADIAH SHIDLER, OF ALLIANCE, OHIO.

WEED AND GRASS TRIMMER, &c.

No. 841,586.

Specification of Letters Patent.

Patented Jan. 15, 1907.

Application filed March 3, 1905. Serial No. 248,352.

*To all whom it may concern:*

Be it known that I, OBADIAH SHIDLER, a citizen of the United States, residing at the city of Alliance, in the county of Stark and State of Ohio, have invented certain new and useful Improvements in Weed and Grass Trimmers, &c., of which the following is a specification.

My invention relates to that class of implements used to trim grass and weeds and to cut ditches or waterways along the sides and edges of walks and drives. In this class of implements as heretofore constructed the scoop or blade has been as a rule attached to a bifurcated handle and without means for regulating the depth of cut.

The object of this invention is to so form the blade and attach the handle as to provide a ready clearance for the weeds, grass, and earth from the tool and to provide also that the cut shall be at a uniform depth. I accomplish these objects in form and manner shown by the accompanying drawings, in which similar letters of reference indicate like parts in all the figures.

Figure 1 is a perspective view of the front of my device. Figs. 2, 3, and 4 are perspective views of the rear of the same device, showing the various kinds of guides or depth-gages used. Figs. 5, 6, and 7 are sectional views suggestive of the different forms that may be given to the blade to suit different tastes or conditions or uses for the device.

In all the forms or figures, A is the back of the blade, which is made wider at one end than the other to receive the handle B, which may be attached by bolts, rivets, or any other means known to the art.

B is the handle, set at a convenient angle to enable the operator to use the tool either by pushing or pulling it, so as to operate the cutting edges E and F.

The blade may be concave at the bottom, as shown in the perspective views, or it may be bent, so that the side G may be set at any angle and may or not, as desired, be provided with the additional side H to hold the cut grass, weeds, or earth.

To regulate the depth of cut, the guide C, Fig. 2, is provided, which may be adjusted by changing the bolts *a* to different holes *b*. Guide C is upturned at each end to prevent its digging into the earth. To reduce friction, the roller-guides D may be used either in combination with the guide C, Fig. 3, or alone, as in Fig. 4.

Having thus described my invention, I claim and desire to secure by Letters Patent of the United States—

A device of the character described comprising, in combination, a scoop-like head open and formed with cutting edges at the front and rear ends and constituting a continuous open passage from end to end, the material on one side of the head being extended upwardly, and a handle attached to said upwardly-extending portion; an adjustable guide attached to the side of said head whereby depth of cut of the device is controlled, said guide having upturned ends and being held in place by bolts passed therethrough and having adjustable engagement with said head, and rollers on said bolts and interposed between said guide and the side of said head, substantially as described.

In testimony whereof I affix my signature in presence of two witnesses.

OBADIAH SHIDLER.

Witnesses:
IRA T. TULLIS,
W. M. NICHOL.